Patented Nov. 6, 1928.

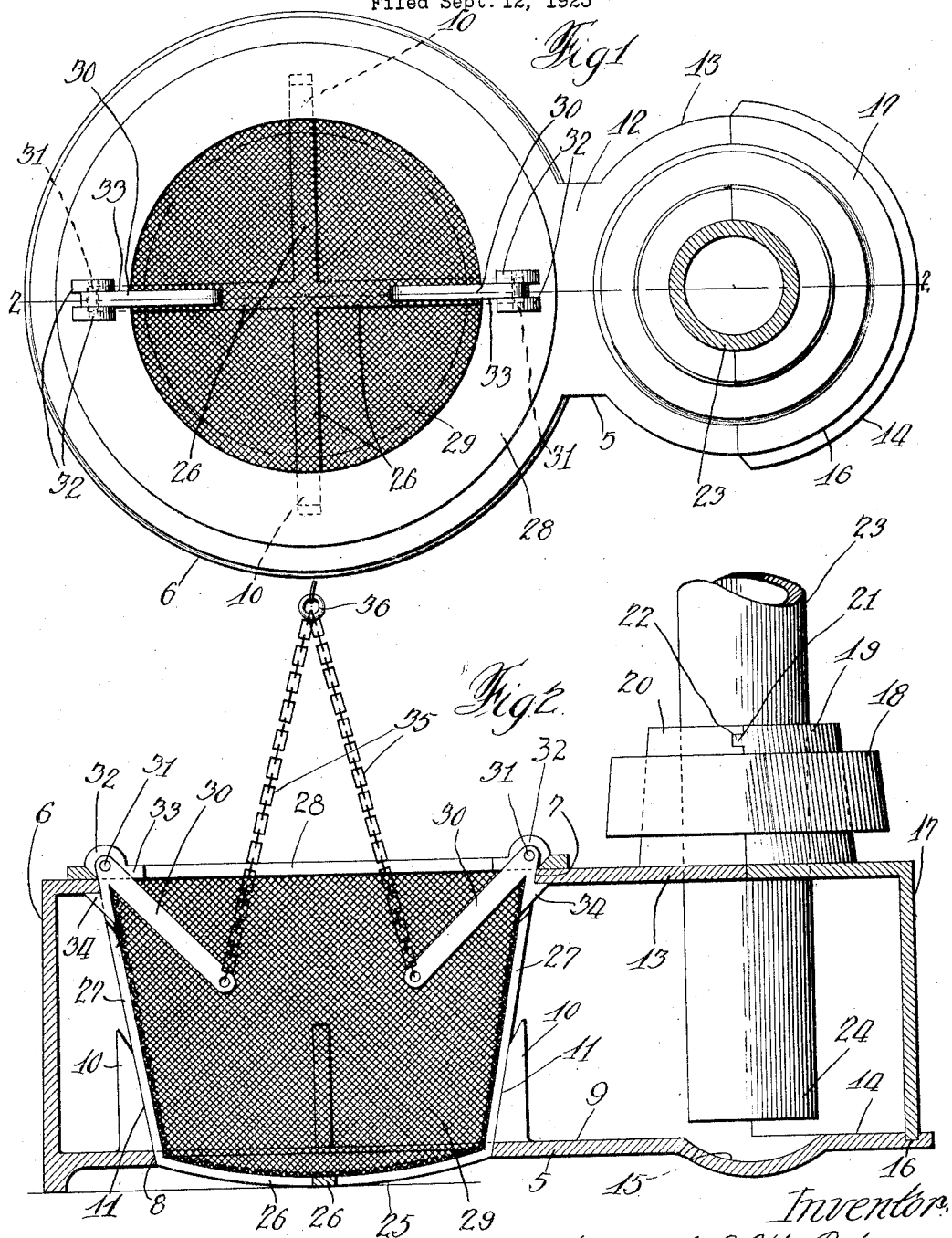

1,690,700

UNITED STATES PATENT OFFICE.

HEINRICH A. W. PETERSEN, OF GARY, INDIANA.

BILGE SUCTION STRAINER FOR SHIPS.

Application filed September 12, 1928. Serial No. 662,181

One of the objects of the present invention is to provide an improved suction strainer for the bilge of ships.

A further object of the invention is to provide a removable strainer by means of which shavings, cotton waste and other rubbish usually accumulated with water in the bilge of ships can be readily removed.

A further object of the invention is to provide an improved locking means for retaining the bucket strainer within the casing.

A still further object of the invention is to provide an easily detachable casing which can be readily connected to the suction pipe of the pump.

These and other objects are accomplished by providing a construction and an arrangement of the various parts in the manner hereinafter described and particularly pointed out in the appended claims.

Referring to the drawings, Fig. 1 is a top plan view of my improved bilge strainer for ships, and Fig. 2 is a cross sectional view taken on the lines 2—2 in Fig. 1.

Considerable difficulty is now experienced in the removal of the accumulated water, oil, cotton waste, and rubbish in the bilge of ships when the strainer connected to the suction pipe and submerged beneath the accumulated water and other refuse becomes clogged, in that it requires an attendant to work beneath the water to clear and clean the strainer. In order to overcome this difficulty I have provided a construction of a suction strainer by means of which the accumulated cotton waste, shavings and other rubbish may be readily collected in a strainer in the form of a bucket and removed from the casing adjacent the end of the suction pipe and cleaned out and returned to its normal operative position. For the purpose of illustration I have shown my improved bilge strainer comprising a casing 5 which consists of an enlarged cylindrical compartment 6 having an enlarged circular aperture 7 on the top side thereof and a relatively smaller circular aperture 8 on the bottom side thereof. The relatively smaller circular aperture 8 is positioned in axial alignment with the aperture 7 in the top side of said casing. Positioned adjacent the circular aperture 8 and formed as an integral part of the bottom 9 of the casing 5 are four upwardly extending guiding members 10. These guiding members are positioned adjacent the periphery of the aperture 8 and spaced apart at substantially ninety degrees about the periphery. The guiding members 10 are provided with inclined or bevelled surfaces 11, which are normally employed for guiding the bucket or strainer into its seat in the casing 5 in the manner hereinafter described. Extending laterally from and formed integrally with the enlarged compartment 6 of the casing 5 is a neck portion 12. Also formed integrally with this neck portion 12 and extending laterally therefrom is a semi-circular compartment or casing 13. The casing or compartment 13 is provided with a circular bottom 14 having an indentation or concavity 15 formed centrally therein. Extending around the bottom 14 adjacent one-half the periphery thereof is a semi-circular groove 16. The semi-circular groove 16 is adapted to removably receive a semi-circular casing or cap 17. The cap or casing 17 is adapted to be removably secured to the semi-circular compartment or casing 13 by a tapered ring 18 which frictionally secures two semi-circular collars 19 and 20, which are formed integrally with the semi-circular casings 17 and 13, respectively. In order to further retain these co-operating or interengaging parts from becoming disengaged from each other, I have provided an interlocking projection 21 formed integrally with the semi-circular collar 19 adapted to interengage with a co-operating recess portion 22 formed in the semi-circular collar 20 of the casing 13, it being understood, of course, that two such like co-operating or interengaging parts are formed on the opposite sides of these semi-circular collars. Extending longitudinally through the collars 19 and 20 and frictionally secured therein is a suction pipe 23 which extends vertically into the semi-circular casings 13 and 17 to a point adjacent the depression or concavity 15 formed in the bottom 14 as shown at 24. The suction pipe 23 of course forms the connection running to the pump for drawing the excess water from the bilge of the ship.

From the above description, it will readily be seen that by removing the tapered ring 18, which frictionally secures the semi-circular collars 19 and 20 of the semi-circular casings 17 and 13, respectively, the cap or semi-circular casing 17 may be readily removed from the semi-circular groove 16, and the co-operating interengaging portions of the semi-circular collars 19 and 20 also disengaged, and thereby permit the casing 5 to be entirely detached from the suction pipe 23 of the pump. My improved removable straining bucket comprises a skeleton frame work as shown at 25, which consists of four diverging members 26 extending substantially at right angles to each other and forming the concave bottom of the bucket. Each of these four members extend upwardly and outwardly at a slight angle with respect to the vertical, as shown at 27, so as to give the bucket the form of an inverted frustum of a cone. Formed integrally with or secured to, in any well known manner, adjacent the tops of the inclined members 27 is an encircling or retaining ring 28 which forms the upper or top portion of the bucket. Mounted within the skeleton bucket 25 and secured therein in any well known manner is a wire mesh 29 which forms the strainer for the bottom and sides and through which all the water must pass before entering the inner chambers of the compartment 6 or 13. In order to lock the bucket within the casing or compartment 6 I have provided oppositely disposed latching members 30 pivoted at 31 to oppositely positioned ears 32 formed integrally with the retaining ring 28. The latching members 30 are adapted to actuate within the slots 33 formed in the retaining ring 28 between the ears 32. The latching members 30 have formed integrally therewith adjacent their pivot 31 pawl portions 34 which are adapted to engage the underside of the top of the casing or compartment 6 adjacent the periphery of the enlarged aperture 7. Secured to the inner ends of the latching members 30 are two cable or chain connections 35 which extend upwardly and are connected together by a single ring or link member 36. The ring or link member 36 is connected by a rope or a cable, not shown, to a hoist which may be used in hoisting the bucket strainer when the same is removed from its casing 5.

From the above description it will be seen that as the strainer bucket 25 is lifted from its seat in the casing, prior to such lifting, the latching members 30 are actuated about their pivots 31 in the ears 32 until they assume a position in which the pawl portions 34 of these latching members become disengaged from the underside of the top of the casing and as the chains 35 are further lifted the bucket 25 is entirely removed from its seat in the casing. When it is desired to return the bucket to its seat in the casing the bucket is lowered to a position in which the bottom of the same enters the circular aperture 28 in the top of the casing 6 and the sides 27 of the bucket proper engage the inclined or bevelled edges 11 of the upwardly extending guide members 10 secured to the bottom 9 of the casing adjacent the periphery of the circular aperture 8, and then as the chains 35 are further lowered the pawls 34 of the latching members 30 are actuated to the locking position, or the position shown in Fig. 2 by the weight of these members. In the use of my improved bilge strainer, it will be readily understood that the same is completely submerged beneath the water and that the pump draws the water from the bilge of the ship through the medium of the suction pipe 23, all the water must pass through the wire meshing of the bucket forming the bottom and sides thereof and enter the enlarged chamber or compartment 6, passing from this chamber through the neck 12 into the relatively smaller chamber 13, where the same passes through the lower end 24 of the suction pipe 23. In the event the strainer should become clogged by reason of shavings, waste or other refuse accumulated on the wire meshing, the pump may be stopped and the bucket removed from its casing by merely drawing up on the cables connected to the chains 35 and the contents of the bucket emptied and returned to its normal operative position, as previously described. If difficulty is found in seating the bucket in the casing, which is normally submerged below the surface of the water, a guiding member may be secured centrally in the bucket or at the sides of the bucket having its lower end secured in any well known manner to the casing and extending above the surface of the water to which the bucket may be slidingly connected in order that the same may be properly guided to its seat in the casing.

From the above description it will be seen that I have provided a very simple and efficient bilge strainer for ships and one which can be readily removed when the same has been clogged by rubbish or refuse accumulated in the bilge of the ship without the necessity of the attendant going beneath the surface of the water, and it will also be seen that a very efficient removable casing connected to the suction pipe has been provided, which also can be removed from the same with great facility.

While in the above specification I have described one embodiment which my invention may assume in practice, it will of course, be understood that the same is capable of modification and that modification may be employed without departing from the spirit and scope of my invention as expressed in the following claims.

What I claim as my invention and desire to secure by Letters Patent is:

1. A bilge suction strainer for ships comprising a casing, a suction pipe extending into said casing, and means co-operable with interengaging portions of said casing for detachably securing said casing to said suction pipe.

2. A bilge suction strainer for ships comprising a sectional casing, a suction pipe extending into said casing, and means co-operable with the sections of said casing for frictionally securing said casing to said suction pipe.

3. A bilge suction strainer for ships comprising a casing, a suction pipe extending into said casing, and means including a removable cap interengaging and co-operating with said casing for detachably securing said casing and cap to said suction pipe.

4. A bilge suction strainer for ships comprising a casing, a suction pipe extending into said casing, a removable cap having portions interengaging with co-operating portions of said casing, and means co-operable with said casing and cap for securing said cap and pipe to said casing.

5. A bilge suction strainer for ships comprising a casing, a suction pipe extending into said casing, a removable cap having portions interengaging with co-operating portions of said casing, and a ring engaging said casing and said cap.

6. A bilge suction strainer for ships comprising a casing, there being an aperture in the top and bottom of said casing, a strainer seated in said apertures, and means carried by said casing for guiding said strainer in properly seating said strainer in said apertures.

7. A bilge suction strainer for ships comprising a casing having a plurality of apertures therein, a strainer in the form of a receptacle removably mounted in said casing and co-operable therewith for closing said apertures, and means for automatically locking said strainer in said casing when said strainer is properly seated in said apertures.

8. A bilge suction strainer for ships comprising a casing having a plurality of apertures, a strainer in the form of a receptacle removably mounted in said casing and co-operable therewith for closing said apertures, and gravity actuated means mounted in said strainer for automatically locking said strainer in said casing when said strainer is properly seated in said apertures.

9. A bilge suction strainer for ships comprising a casing having a relatively large cylindrical compartment there being circular openings in the top and bottom of said compartment, a strainer in the form of a bucket adapted to be seated in the circular openings in said compartment, a second cylindrical compartment in communication with said first compartment, and means for detachably securing a suction pipe centrally in said second compartment.

In testimony whereof I have signed my name to this specification on this 6th day of September, A. D. 1923.

HEINRICH A. W. PETERSEN.